H. CASSIDY.
SWIVEL TUBE COUPLING.
APPLICATION FILED MAR. 27, 1912.

1,075,693.

Patented Oct. 14, 1913.

WITNESSES:
F. Streit
G. Ericsson

INVENTOR
Hugh Cassidy
BY
Francis D. Ammen
his ATTORNEY

UNITED STATES PATENT OFFICE.

HUGH CASSIDY, OF BROOKLYN, NEW YORK.

SWIVEL TUBE-COUPLING.

1,075,693.　　　　　　Specification of Letters Patent.　　　Patented Oct. 14, 1913.

Application filed March 27, 1912. Serial No. 686,609.

*To all whom it may concern:*

Be it known that I, HUGH CASSIDY, a citizen of the United States, and resident of Brooklyn, in the county of Kings and State of New York, have invented certain new and useful Improvements in Swivel Tube-Couplings, of which the following is a specification.

This invention relates to a pipe coupling and particularly to a swivel connection or joint for connecting sections of pipe so as to permit a rotary movement of one section with respect to the other.

A principal object of the invention is to produce a coupling of this kind which will effectively pack the pipe connection to prevent leakage but which is constructed in such a way as to permit a swivel movement at the connection, and which will not tend to disturb the packing in any way.

A further object of the invention is to provide a construction which will not exert any tendency to loosen the packing nut when the swiveling movement takes place.

A further object of the invention is to provide a construction which will tend to relieve the packing of any tendency to be moved outwardly from the face of the tube connection which is being packed.

In carrying out my invention, I provide a tubular nipple or connection having a collar held within the coupling. In ordinary swivel connections such a collar is employed and the packing is compressed in the stuffing box against this collar. In other words, the joint is packed against the collar as well as against the side of the tubular pipe connection. In my construction, I relieve the collar of the nipple of all pressure and pack the connection solely on the cylindrical face of the tubular connection. I not only relieve the collar of all pressure, but I provide an arrangement permitting a slight longitudinal movement of the tubular connection within the coupling. I also prefer to provide the nipple with an inner extension fitting accurately in a bore in the coupling body. This centers the nipple and prevents lateral play which would tend to loosen the packing.

The invention consists in the construction and combination of parts to be more fully described hereinafter and particularly set forth in the claim.

Figure 1:
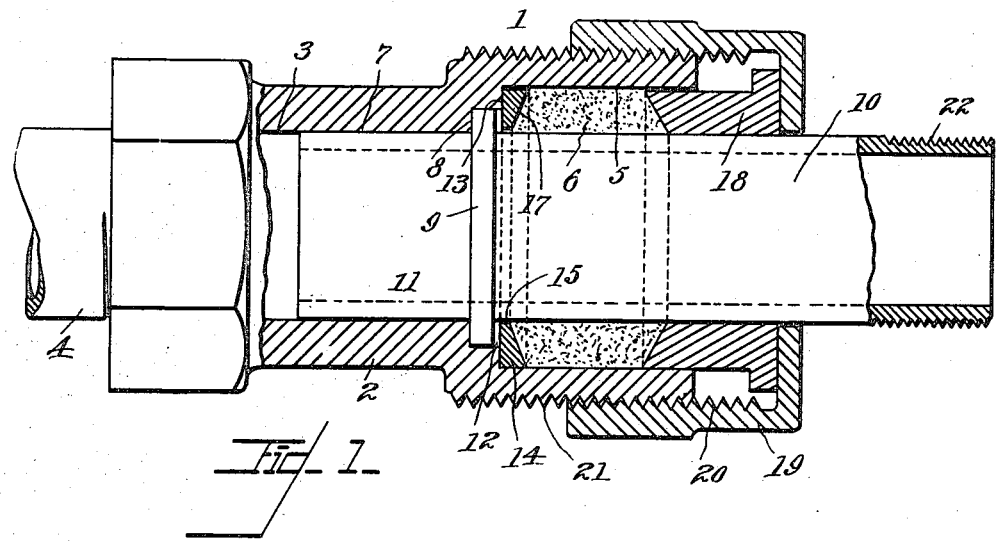
Figure 2:
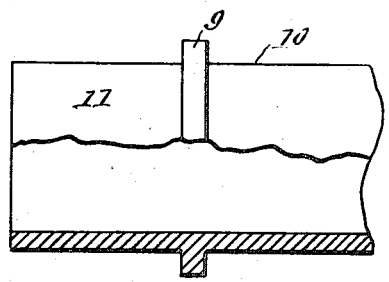

In the drawing which fully illustrates my invention, Figure 1 is a longitudinal central section through a swivel pipe coupling constructed according to my invention, the tubular nipple or pipe connection being shown partly in elevation and partly in section. Fig. 2 is a side elevation and partial section showing a portion of the inner end of the tubular nipple removed from the coupling.

Referring more particularly to the parts, 1 represents the body of the coupling which has a neck 2, with internal threads beyond the point 3 to receive one of the pipe sections 4 which are to be connected together. The opposite end of the body 1 is formed with a bore or stuffing box 5 of enlarged diameter in which a suitable soft packing 6 is received. The neck 2 is provided with a reduced central tubular bore 7 which is counterbored so as to form a depressed seat 8 for a collar 9, which is formed upon a tubular nipple or pipe connection 10. Beyond collar 9, the nipple has a neck 11 which fits neatly in the bore 7, so as to center the nipple in the coupling.

At the counter-bored seat 8, a collar recess 12 is formed, which is deeper than the thickness of the collar 9, and around the edge of the recess a second annular washer seat 13 is formed, which forms part of the inner end or bottom of the stuffing box 5. On this seat 13 I provide a washer or packing ring 14, through the opening 15 of which the tubular nipple 10 passes loosely. The inner edge of this washer overhangs the recess 12 in the manner indicated in Fig. 1, and forms a stop for the collar 9 to limit the outward movement of the nipple 10. The outer side of the washer 14 is provided with an inclined or beveled face 17, which tends to crowd the packing 6 against the lateral surface of the nipple 10 within the stuffing box. In order to compress the packing in this way, I provide a gland 18 of ordinary construction, which slides into the stuffing box as indicated. This gland is forced inwardly by means of a coupling nut 19 of common form, which has internal threads 20 received on threads 21 on the body 1. The outer end of the nipple 10 is provided with screw threads 22 to enable the coupling to be attached to the pipe which is to be connected to pipe 4. When the gland 18 is forced in, the pressure or thrust which the packing 6 exerts against the ring or washer 14 is taken up by the seat 13, and it will be evident that no pressure whatever is exerted upon the collar 9. There is, therefore, no tendency for the collar 9 to rotate the ring or washer 14 when a swiveling movement takes place in the nipple and consequently, there is no tendency to rotate the packing and the gland through the medium of the packing. Hence there is no tendency to loosen the coupling nut 19.

Special attention is called to the function of the neck 11 in assisting in effecting a non-leaking connection. This neck fitting neatly as it does in the bore 7, prevents any lateral play or movement of the body of the nipple 10, and by a consideration of the construction described, it will be evident that this tends to prevent a loosening of the packing 6 around the packed zone of the tube 10.

What I claim and desire to secure by Letters Patent is:—

A swivel coupling having a body with an enlarged bore, said bore having a washer-seat at the bottom thereof, said body having a reduced bore, and a counterbore forming a recess and a collar seat at the bottom thereof, a tubular nipple lying in said enlarged bore having a collar lying in said recess, said collar being wholly received within said recess, said nipple having a tubular neck received neatly in said reduced bore and preventing lateral movement of said nipple in said enlarged bore, a packing in said enlarged bore, a rigid packing washer on said washer-seat projecting inwardly over said recess to retain said collar and relieving said collar of the thrust of the packing, a gland extending into said enlarged bore to compress the packing against said packing washer, and a coupling member for forcing said gland against said packing.

Signed at New York in the county of New York and State of New York this 23rd day of March A. D. 1912.

HUGH CASSIDY.

A. W. PALMER,
MERLE I. ST. JOHN.